United States Patent
Khalfallah et al.

(10) Patent No.: US 7,324,751 B2
(45) Date of Patent: Jan. 29, 2008

(54) SELECTIVE FREQUENCY SWITCHING SYSTEM AND A RECONFIGURABLE OPTICAL DELAY CIRCUIT INCORPORATING IT

(75) Inventors: Sabry Khalfallah, Paris (FR); Denis Penninckx, Nozay (FR)

(73) Assignee: Alcatel, Paris (FR)

( * ) Notice: Subject to any disclaimer, the term of this patent is extended or adjusted under 35 U.S.C. 154(b) by 776 days.

(21) Appl. No.: 10/262,845

(22) Filed: Oct. 3, 2002

(65) Prior Publication Data

US 2003/0067650 A1    Apr. 10, 2003

(30) Foreign Application Priority Data

Oct. 5, 2001    (FR) .................................. 01 12807

(51) Int. Cl.
*H04J 14/00* (2006.01)
(52) U.S. Cl. ...................................................... 398/45
(58) Field of Classification Search ............. 398/45–54
See application file for complete search history.

(56) References Cited

U.S. PATENT DOCUMENTS

| 5,434,937 | A | * | 7/1995 | Glance ........................ 385/24 |
| 5,526,153 | A | * | 6/1996 | Glance ........................ 398/85 |
| 5,566,014 | A | * | 10/1996 | Glance ........................ 398/83 |
| 5,680,490 | A | * | 10/1997 | Cohen et al. .................. 385/24 |
| 7,058,302 | B2 | * | 6/2006 | Khalfallah et al. ............ 398/48 |

OTHER PUBLICATIONS

Jeyashankher Ramamirtham and Jonathan Turner Design of Wavlength Converting Switches for Optical Burst Switching Washington University of St. Louis—School of Engineering & Applied Science Aug. 7, 2001.*
Lucent Technologies 40-Channel Arrayed Waveguide Grating Multiplexer/Demultiplexer Preliminary Data Sheet Nov. 1999.*
Yuri Gurevich What does O(n) mean? SIGACT News 17 (1986), No. 4, 61-63.*
A. Misawa et al, "WDM Knockout Switch with Multi-Output-Port Wavelength-Channel Selectors", Journal of Lightwave Technology, IEEE, New York—vol. 16, No. 12, Dec. 1998 pp. 2212-2219, XP000833965.
A. Misawa et al, "Two-output-port fast tunable filter witih low loss and low loss variation for 32 wavelength channels" Electronics Letters, IEE Stevenage< GB, vol. 353, No. 8, Apr. 15, 1999, pp. 657-658, XP006012028.

* cited by examiner

*Primary Examiner*—Jason Chan
*Assistant Examiner*—David Lee
(74) *Attorney, Agent, or Firm*—Sughrue Mion, Pllc

(57) ABSTRACT

The invention relates to a reconfigurable optical switching system for selectively coupling one or more frequencies of first and second input wavelength division multiplex signals (WDM1, WDM2) consisting of N channels to first and second output ports (O1, O2). The invention also relates to a variable and reconfigurable optical delay circuit comprising said optical switching system associated with an optical delay loop. The input frequency division multiplex optical spectra (WDM1, WDM2) are therefore divided by a first demultiplexer (Demux) to a plurality of interleaved stages of optical switches (D, C, A and B) which selectively feed a plurality of input ports ($M_i$) of a multiplexer (Mux), which then uses its routing properties to implement in particular the complex reconfigurable multiple 2×2 frequency switching function.

5 Claims, 5 Drawing Sheets

US 7,324,751 B2

SELECTIVE FREQUENCY SWITCHING SYSTEM AND A RECONFIGURABLE OPTICAL DELAY CIRCUIT INCORPORATING IT

The invention relates to frequency division multiplex optical fiber transmission systems and to be more precise to a reconfigurable 2×2 frequency switching system capable of selectively combining any spectral channel (frequency or frequency band) of first and second incoming frequency division multiplex (WDM) signals at first and second output ports as a function of their frequency.

FIELD OF THE INVENTION

The field of the invention is therefore that of optical switching architectures.

Identical frequencies transporting different information intended for different destinations arrive at optical switching nodes, which must orient the information towards the respective destinations.

To do this, the optical switches employ N×N switching means to switch the optical channels of the incoming frequency division multiplex signals.

BACKGROUND OF THE INVENTION

Many kinds of add and drop frequency multiplexers or switching systems of the above type are known in the art.

In particular, FIG. 1 shows diagrammatically a system of the above kind for multiplexing N channels. That system is described in "Integrated Multichannel Optical Wavelength Selective Switches Incorporating an Arrayed-Waveguide Grating Multiplexer and Thermooptic Switches", April 1998, J. of Lightwave Technol., Vol. 16, No. 4, pp. 650-655.

The system shown in FIG. 1 includes an arrayed waveguide grating (AWG) 10. The AWG 10 has 2N+2 input ports numbered 1 to 2N+2 and 2N+2 output ports also numbered 1 to 2N+2. An array of N 2×2 optical switches SW1 to SWN interconnects the input and output ports of the AWG 10 via looping lines 20.

A first N-channel input multiplexer M1 codes information i1, i2, . . . , iN on respective frequencies f1, f2, . . . , fN and a second N-channel input multiplexer M2 codes information i'1, i'2, . . . , i'N on the respective frequencies f1, f2, . . . , fN.

Thus the same frequencies f1 to fN convey different information. The system switches information coded on one or more particular frequencies between the two input multiplexes and the two multiplexes recovered at the output of the system.

In the FIG. 1 example, it is typically required to switch information i2 coded on the frequency f2 and information iN coded on the frequency fN with information i'2 and i'N coded on the same frequencies between the two input ports and the two output ports of the system.

The operating principle for this particular example is based on the fact that the frequencies of the first multiplex that enter at the input port 1 are to be demultiplexed to the output ports N+3 to 2N+2 and all the frequencies of the second multiplex that enter at the input port N+2 are to be demultiplexed to the output ports 2 to N+1.

The signals demultiplexed in this way are then guided to the N 2×2 optical switches SW1 to SWN. The signals with the same frequency fi from the two input multiplexes M1 and M2 are sent to the same 2×2 switch SWi. The output signals switched by the N 2×2 switches are then looped to the input ports of the AWG 10.

The signals looped to the input ports N+3 to 2N+2 and the signals looped to the input ports 2 to N+1 are automatically re-multiplexed and sent to AWG output ports 1 and N+2, respectively.

For a particular frequency fi, each switch SWi sends the signal coded on the frequency fi either to the first set of input ports 2 to N+1, to be more precise to the input port i+1, or to the second set of input ports N+3 to 2N+2, to be more precise to the input port i+N+2. Each switch SWi therefore changes the output port numbered 1 or N+2 to which the information coded at the frequency fi is to be sent.

However, the routing element employed in the FIG. 1 system, i.e. the AWG, is not optimized at all in terms of the number of channels. Processing N channels with the above kind of architecture requires a routing element capable of routing 2N+2 channels. The AWG is therefore rated higher than is strictly necessary, requiring 2N+2 input ports and 2N+2 output ports to process N frequencies.

This amounts to approximately doubling the number of waveguides in the AWG, making the system complex and costly to implement.

Another drawback of the above solution is that the system is based on the use of 2×2 optical switches.

If the switches are thermo-optical switches, the operating speed of the system is limited. With thermo-optical switches, the system is incapable of selecting frequency-coded information in less than a few nanoseconds.

Accordingly, the object of the present invention is to provide a compact and fast system which is capable of multiple switching of frequency division multiplex signals between two input ports and two output ports and which alleviates the drawbacks of the prior art.

To this end, the invention exploits the routing properties of AWG multiplexers to expand the architecture of a conventional wavelength selector to yield an architecture comprising a plurality of interleaved stages of optical switches.

The incoming frequency division multiplex optical spectra are therefore divided by a first demultiplexer and sent to a plurality of interleaved stages of optical switches which selectively feed a plurality of input ports of a multiplexer whose routing properties are then used in particular to implement the complex function referred to above, namely reconfigurable multiple 2×2 frequency switching.

It is also proposed, starting from the architecture of the switching system according to the present invention, to use an optical delay system able to adopt multiple configurations and to store, delay and extract variable length optical packets.

Optical delay circuits of the above kind are known in the art, in particular the solution developed by NTT and described in "Variable optical delay circuit using wavelength converters", March 2002, Electron. Lett., Vol. 37, No. 7, pp. 454-455. FIG. 2 is a diagram of the above kind of prior art system, which is described next with reference to that figure.

A frequency $f_j$ conveying information $i_j$ arrives at an optical input port 1 of the system. In the FIG. 2 example, j is from 1 to 5 and the optical packets can therefore be coded on five different frequencies. Consider the case where an optical packet is coded on the frequency $f_1$. A coupler 2 sends the signal to a circulator 3 which directs the signal to an AWG demultiplexer Demux. A filter 4 is inserted between the circulator 3 and the AWG Demux to reject the frequency $f_5$. Because the packet is coded at $f_1$, it is not rejected by the filter 4 and is therefore demultiplexed and sent to the first output line of the demultiplexer Demux in accordance with a conventional routing property of the AWG. Each of the four output lines of the demultiplexer Demux for respectively receiving the signal coded on $f_1$, the signal coded on $f_2$, the signal coded on $f_3$ and the signal coded on $f_4$ has a first stage comprising a semiconductor optical amplifier 5, a second stage comprising an optical band-pass filter 6, and finally a final stage comprising a wavelength converter 8, one input of which is connected to a laser diode 7.

Accordingly, circulation losses are compensated by the optical amplifiers and unwanted noise introduced by the amplifier is eliminated by the optical filter 6. The optical converter 8 on the far side of each filter 6 is fed with the demultiplexed signal and with the signal from one of the laser diodes 7 for the respective four lines, which supply the converters 8 with the frequencies $f_2$, $f_3$, $f_4$ and $f_5$.

Accordingly, in the present example of a packet initially coded on $f_1$, the packet is then coded on $f_2$. The signal is re-multiplexed by the multiplexer Mux and fed into the optical delay loop 9. It therefore passes again through the coupler 2, the circulator 3 and the filter 4. Because the signal is now coded on $f_2$, it is not rejected by the filter. This time it is demultiplexed onto the second output line of the demultiplexer Demux and therefore converted to the frequency $f_3$ before it is fed again into the optical loop, and so on.

Accordingly, the wavelength of the optical signal inserted into the loop is sequentially shifted until it reaches the frequency $f_5$. Once it has reached the frequency $f_5$, the signal is rejected by the filter 4 and is sent to the output of the delay circuit via the circulator 3.

In this example, the packet initially coded on $f_1$ is inserted four times into the delay loop before it is converted to the frequency $f_5$. In the same way, a signal arriving in the delay circuit coded on $f_2$ travels round the loop three times, a signal coded on $f_3$ travels round the loop twice, and so on, until a signal coded on $f_5$ is not looped at all.

Consequently, the number of times the signal travels round the loop, or to be more precise the time-delay introduced by the delay loop prior to the release of the signal, has a value that depends directly on the frequency on which the signal is initially coded.

The characteristic relating the duration of the time-delay to the frequency on which the signal is coded is itself a limiting factor on the architecture, since no flexibility is allowed in terms of the duration of the time-delays. Accordingly, it is not possible to adjust the delay at will to a required duration, as the duration is directly dependent on the frequency on which the signal is coded.

Moreover, the above prior art solution imposes the use of many somewhat complex elements, in particular the combination of the laser diodes 7 and the wavelength converters 8. The complexity of this solution therefore constitutes a brake on the implementation of this kind of optical delay circuit.

OBJECTS AND SUMMARY OF THE INVENTION

To alleviate these drawbacks, the 2×2 optical switching system according to the present invention incorporates a delay loop to provide an optical delay circuit which is simple to implement and in which the duration of the time-delay is completely variable and does not depend on the frequency of the signal. This makes time-delay management totally flexible. Thus any frequency channel of any input optical spectrum can be delayed for a duration that is a multiple of a reference duration.

The present invention therefore proposes an unique architecture for implementing, at one and the same time, firstly a compact and fast system for selectively switching incoming frequency division multiplex signals between two input ports and two output ports as a function of their frequency and secondly an optical delay system that exploits the characteristics of the preceding system and thereby offers great adaptability in terms of the duration of the time-delays.

The invention therefore provides a reconfigurable optical switching system for selectively coupling one or more frequencies of first and second input frequency division multiplex signals comprising N channels to first and second output ports, which system is characterized in that it comprises:

a demultiplexer having at least a first input port and a second input port for respectively receiving said first and second frequency division multiplexes comprising N channels and at least N+2 output ports, in which demultiplexer, for all values of i from 1 to N, the output port numbered i of said demultiplexer is adapted to receive the corresponding frequency numbered i of the first multiplex received at the first input port, and, for all values of i from 3 to N+2, the output port numbered i of said demultiplexer is adapted to receive the frequency numbered i−2 of the second multiplex received at the second port, a multiplexer having at least N+1 input ports and at least two output ports, in which multiplexer, for all values of i from 2 to N+1, the input port numbered i of said multiplexer is adapted to route the frequency numbered i−1 to the first output port of said multiplexer, and, for values of i from 1 to N, the input port numbered i of said multiplexer is adapted to route the frequency numbered i to the second output port of said multiplexer, and optical switching means for selectively connecting, for i from 3 to N, any output port numbered i of said demultiplexer to the input port numbered i−2 of said multiplexer, to the input port numbered i−1 of said multiplexer, or to the input port numbered i+1 of said multiplexer, the output ports numbered 1 and numbered 2 of said demultiplexer being selectively and respectively connected to the input ports numbered 1 or 2 of said multiplexer and to the input ports numbered 2 or 3 of said multiplexer, and the output ports numbered N+1 and N+2 of said demultiplexer being selectively connected respectively to the input ports numbered N−1 or N of said multiplexer and to the input ports numbered N or N+1 of said multiplexer.

The invention also provides a variable and reconfigurable optical delay circuit characterized in that it comprises said optical switching system, which is associated with an optical delay loop connecting an output port of said switching system to an input port of said switching system.

BRIEF DESCRIPTION OF THE DRAWINGS

Other features and advantages of the present invention will become more clearly apparent in the light of the description given by way of illustrative and non-limiting example and with reference to the accompanying drawings, in which.

MORE DETAILED DESCRIPTION

Figure 1:
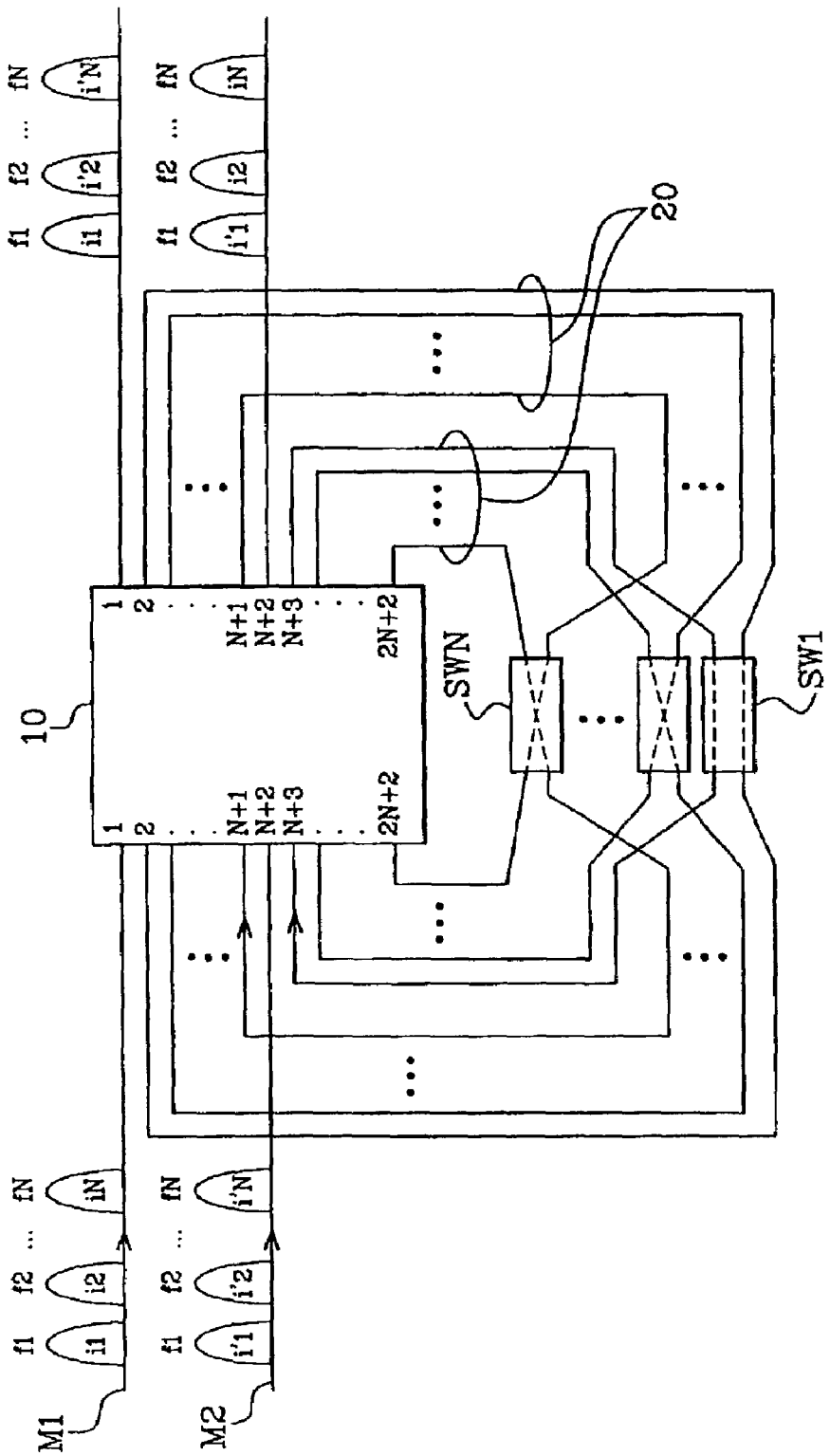
FIG. 1 is a diagram showing a prior art add and drop frequency multiplexer and 2×2 signal switching system, and has already been described hereinabove.
Figure 2:
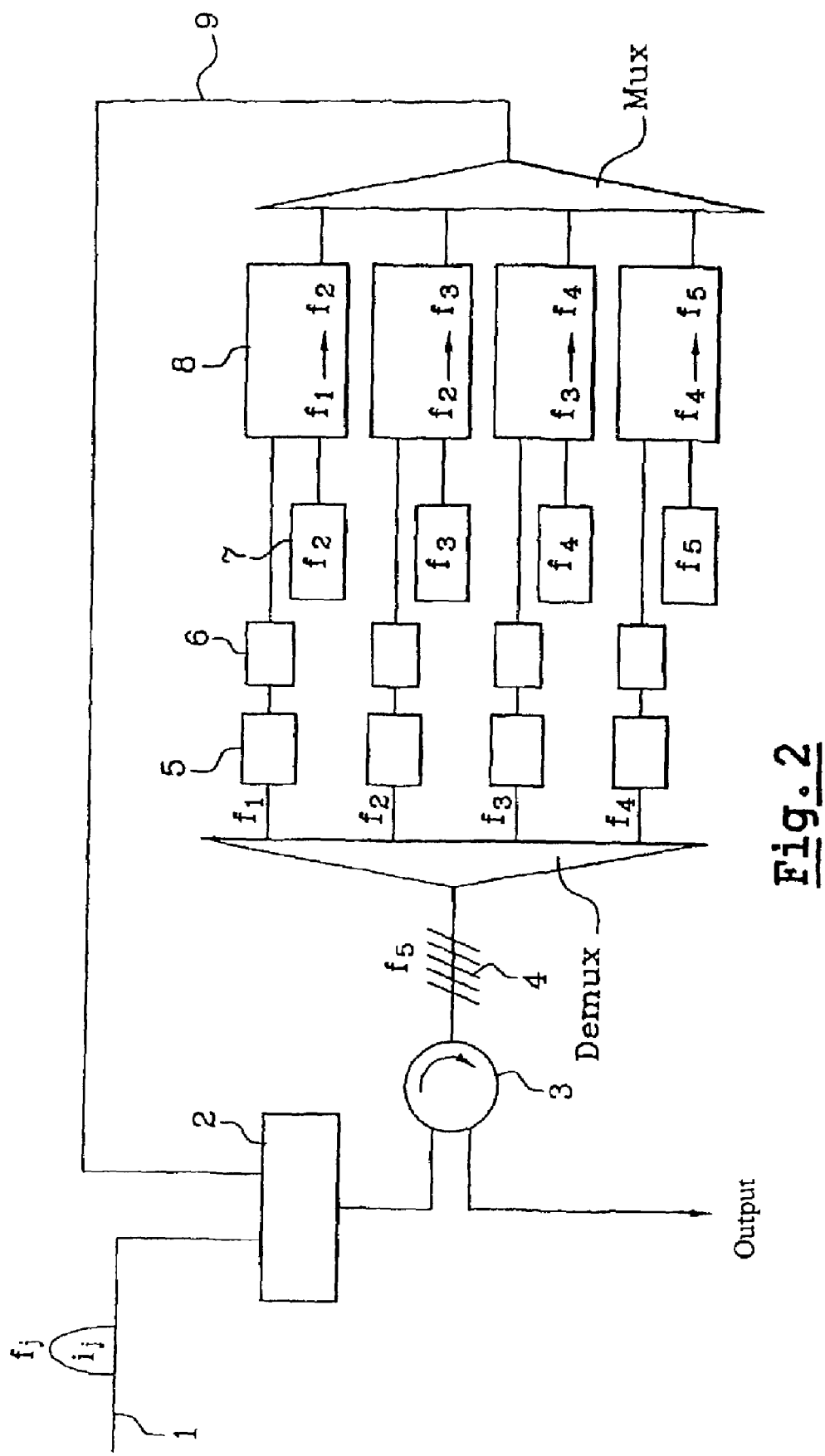
FIG. 2 is a diagram showing a prior art optical delay circuit, and has already been described.
Figure 3:
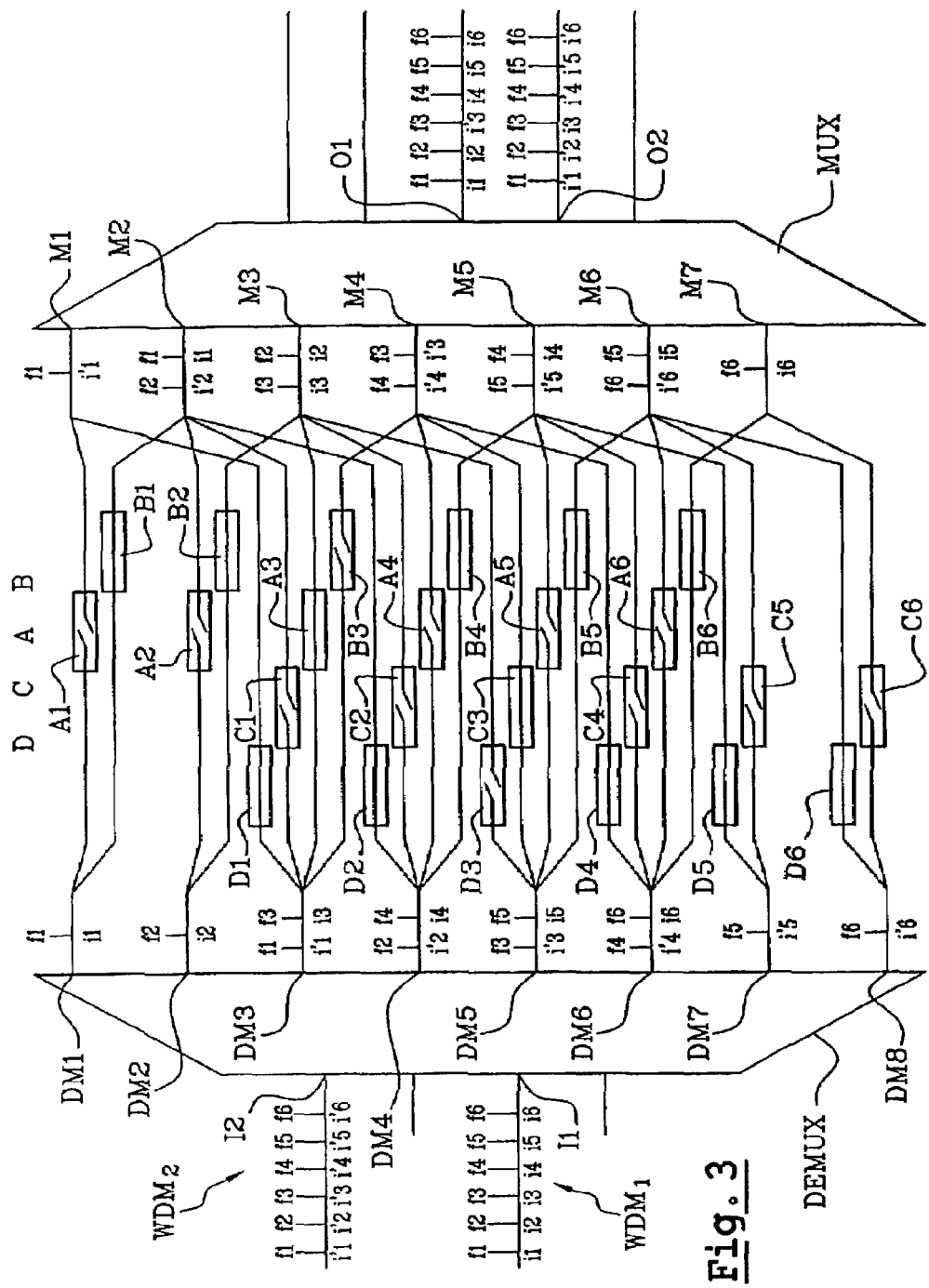
FIG. 3 is a diagram of one embodiment of the reconfigurable 2×2 frequency switching system.

FIG. 3 therefore shows an example of the operating principle of an optical switching system according to the present invention.

The operation of the system is based on frequency division multiplex input signals comprising N channels. In the FIG. 3 example, N is equal to 6.

The system includes a first demultiplexer Demux which has at least two input ports I1 and I2 and at least N+2 output ports and a multiplexer Mux which has at least N+1 input ports and at least two output ports O1 and O2. In the FIG. 3 example, the multiplexer in fact has six output ports, but only the two output ports O1 and O2 are relevant to the invention.

The demultiplexer Demux and the multiplexer Mux are both used as routers and are preferably of the AWG type.

The output ports of the respective demultiplexers DM1 to DMN+2 are connected to the input ports M1 to MN+1 of the multiplexer via optical switching means.

The optical switching means comprise four interleaved optical switching stages D, C, A and B, and each optical switching stage comprises N optical switches. The optical switches can be optical amplifiers, for example.

A first input frequency division multiplex WDM1 comprising frequencies f1 to fN (N=6) is received at the input port I1 of the demultiplexer Demux. A second multiplex WDM2 comprising the same frequencies f1 to fN (N=6) is received at the input port I2 of the demultiplexer Demux.

The two multiplexes WDM1 and WDM2 transport different information coded on the same frequencies.

Accordingly, the multiplex WDM1 transports information i1, i2, i3, etc. coded on the respective frequencies f1, f2, f3, etc. and the multiplex WDM2 transports information i'1, i'2, i'3, etc. coded on the respective frequencies f1, f3, f3, etc.

The multiplexes WDM1 and WDM2 are demultiplexed by the demultiplexer Demux.

For i from 1 to N, the output port DMi receives information coded on the corresponding frequency fi of the first multiplex WDM1.

In accordance with one particular routing property of the demultiplexer Demux, because it is received two input ports higher than the central input port I1 of the demultiplexer Demux, the second multiplex WDM2 is demultiplexed two output ports lower.

Accordingly, for i from 3 to N+2, the output gate DMi receives the frequency fi-2 from the second multiplex WDM2 received at the input port I2.

Most of the N+2 output ports of the demultiplexer Demux are divided into four arms, each of which addresses one of four optical switching stages D, C, A and B. The four arms are not recombined to the same input port of the multiplexer Mux, but to the contrary are connected to different input ports of the multiplexer Mux.

For i from 3 to N, the output port DMi of the multiplexer Demux is connected to the optical switch Di+2 of the optical switching stage D, to the optical switch Ci+2 of the optical switching stage C, the optical switch Ai of the optical switching stage A and the optical switch Bi of the optical switching stage B.

The output ports DM1 and DM2 of the demultiplexer Demux are divided into two and are respectively connected to the optical switches A1 and B1 and to the optical switches A2 and B2.

The output ports DMN+1 and DMN+2 are respectively connected to the optical switches CN-1 and DN-1 and to the optical switches CN and DN.

For i from 2 to N, the optical switches Ai, Bi-1, Ci-1 and Di are connected to the same input port Mi of the multiplexer Mux.

The optical switches $A_1$ and $D_1$ are connected to the input port M1 of the multiplexer Mux and the optical switches BN and CN are connected to the input port MN+1 of the multiplexer Mux.

Accordingly, for i from 3 to N, the switching means D, C, A and B connect any output port DMi of the demultiplexer Demux to the input port Mi-2, the input port Mi-1, the input port Mi, or the input port Mi+1 of the multiplexer Mux.

The output port DM1 of the demultiplexer is connected either to the input port M1 or to the input port M2 of the multiplexer by the respective optical switches A1 and B1 and the output port DM2 is connected either to the input port M2 or to the input port M3 of the multiplexer by the respective optical switches A2 and B2.

Finally, the output port DMN+1 of the demultiplexer is connected either to the input port MN-1 or to the input port MN of the multiplexer by the respective switches DN-1 and CN-1 and, finally, the output port DMN+2 is connected either to the input port $M_N$ or to the input port $M_{N+1}$ of the multiplexer by the respective switches DN and CN.

At the output of the demultiplexer Demux, the demultiplexed frequencies from the two input multiplexes WDM1 and WDM2 are therefore divided inside the four interleaved optical switching stages D, C, A and B in accordance with the rules stated hereinabove and are then sent to the input ports of the multiplexer Mux or eliminated, as a function of the activation of the various optical switches constituting each of the optical switching stages. The frequencies constituting the two input multiplexes are then selectively addressed to the consecutive input ports M1 to MN+1 of the multiplexer Mux.

In accordance with a particular routing property of the routing multiplexer Mux, considering all the frequencies that enter the router multiplexer Mux with the same configuration as at the output of the demultiplexer Demux, i.e. the frequency f1 addressed to the input port M1 of the multiplexer, the frequency f2 addressed to the input port M2 of the multiplexer, etc., these frequencies are multiplexed at the central output port O2 of the router multiplexer Mux.

On the other hand, considering the frequencies that are shifted one port downward at the input of the router multiplexer Mux, i.e. the frequency f1 addressed to input port $M_2$ and the frequency f2 addressed to input port $M_3$, these frequencies are multiplexed at a higher output port, i.e. the output port O1 of the router multiplexer Mux.

The optical switches of the various stages D, C, A and B can be activated in the following manner.

In accordance with a particular routing property of the routing multiplexer Mux, considering all the frequencies that enter the router multiplexer Mux with the same configuration as at the output of the demultiplexer Demux, i.e. the frequency f1 addressed to the input port M1 of the multiplex, the frequency f2 addressed to the input port M2 of the multiplexer, etc., these frequencies are multiplexed at the central output port O2 of the router multiplexer Mux.

On the other hand, considering the frequencies that are shifted one port downwards at the input of the router multiplexer Mux, i.e. the frequency f1 addressed to input port M2 and the frequency f2 addressed to input port M3, these frequencies are multiplexed one output port higher, i.e. at the output port O1 of the router multiplexer Mux.

The optical switches of the various stages D, C, A and B can be activated in the following manner. In a first configuration the optical switching stages D and C are not activated, i.e. all their optical switches are turned off, and the switching stages A and B are configured in a complementary fashion.

Accordingly, for i from 1 to N, switch Ai is closed and switches Aj i are open, switch Bi is open and switches Bj I are closed. In this kind of configuration, the frequency fi of an incoming WDM signal at the input port I1 of the system leaves at the central output port O2 and all the other frequencies fj i of the WDM signal leave at the higher output port O1.

When a second WDM signal coded on the same frequencies f1 to fN as the first WDM signal received at the input port I1 is sent simultaneously to the second input port I2 of the system and the optical switching stage C is configured in the same way as the stage A (that is to say, for i from 1 to N, the switch Ci is closed and the switches Cj i are open), the signal coded on the frequency fi of the second incoming multiplex at the input port I2 is inserted into the optical spectrum obtained at the output port O1.

In accordance with one particular routing property of the router demultiplexer Demux, since the signal coded at the frequency fi of the incoming multiplex at the input port I2 arrives at the input of the demultiplexer two ports above the central input port I1, it is routed to the output of the demultiplexer Demux two ports lower, i.e. to the output port DMi+2. The signal coded on the frequency fi is then sent to the input port Mi+1 of the router multiplexer Mux, because the switch Ci is activated, and is therefore routed to the output of the router multiplexer one output port higher relative to the central output port O2, i.e. to the output port O1, in accordance with the routing property explained above.

If the optical switching stage D is then configured in a complementary manner to the switching stage C, that is to say, for i from 1 to N, the switch Di and the switches Dj i are closed, the frequencies fj i of the second multiplex received at the input port I2 are sent to the output port O2. They are first demultiplexed to the output ports DMj+2 of the router demultiplexer Demux and then sent to the input ports $M_j$ because the optical switches $D_{j\,i}$ are activated. The frequencies fj i are then routed to the central output port O2 of the system.

In the configuration explained above in general terms, the system according to the invention effects selective switching of the frequency fi between the input ports I1 and I2 and the output ports O1 and O2.

FIG. 3 shows one particular example of this configuration, with N=6 and i=3.

Thus FIG. 3 shows an embodiment in which each of the two WDM signals WDM1 and WDM2 arriving at the respective input ports I1 and I2 comprises six frequency channels f1 to f6.

Considering first the first multiplex WDM1, the information i3 coded on the frequency f3 is extracted from the output port I1 and exits at the central output port O2 of the multiplexer Mux, and all the other information i1, i2, i4, i5 and i6 coded on the respective frequencies f1, f2, f4, f5 and f6 is sent from the input port I1 to the second higher output port O1 of the multiplexer.

Considering next the second multiplex WDM2 received simultaneously at the input port I2 of the demultiplexer Demux, the information i'3 coded on the frequency f3 is inserted from the input port I2 into the optical output spectrum at the output port O1 of the multiplexer Mux. As the information i'3 coded on f3 enters the demultiplexer two input ports higher relative to the central input port I1, it is routed two output ports lower at the output ports of the demultiplexer, i.e. to the output port DM5.

The information i'3 coded at f3 is then sent to the input port M4 of the multiplexer because the optical switch C3 is activated. Consequently, the information i'3 is routed one output port higher relative to the central output port O2 of the multiplexer and is inserted into the output optical spectrum at the output port O1.

Simultaneously, all of the other information i'1, i'2, i'4, i'5 and i'6 coded on the respective frequencies f1, f2, f4, f5 and f6 is sent from the input port I2 to the central output port O2 of the multiplexer.

To avoid complicating the figure further, not all of the frequencies constituting the two input multiplexes WDM1 and WDM2 are shown at the input and output ports of the multiplexer Mux. Only the frequencies actually routed to the output ports O2 and O1 are represented at the input ports M1 to M7 of the router multiplexer Mux.

Up to six different frequencies can be present at some input ports of the router multiplexer Mux and are then routed to six output ports of the multiplexer Mux. Of these six output ports, only the two output ports O1 and O2 are relevant to the switching function employed. The four supplementary output ports, not identified by reference numbers in FIG. 3, do not furnish a complete optical spectrum, but can nevertheless be used for signal monitoring purposes.

The FIG. 3 example therefore shows selective switching of the frequency fi between the input ports I1 and I2 and the output ports O1 and O2 of the system.

However, the FIG. 3 system can also use multiple frequency switching between the input ports I1 and I2 and the output ports O1 and O2.

To do this, it is necessary to activate (i.e. to close) a plurality of optical switches in the switching stage A, to activate the optical switches of the stage C with the same configuration, and finally to activate the optical switches of the switching stages B and D in a complementary manner relative to the switching stages A and C.

The operation of the system according to the present invention for frequency selective switching between two input wavelength division multiplexes can be adapted very flexibly and combines add and drop frequency multiplexing and switching functions so that it can selectively execute 2×2 switching for each frequency simultaneously. The add and drop frequency multiplexing extracts to the drop port O2 information coded on a particular frequency from the input port I1 and adds at the output port O1 other information coded at the same incoming frequency at the add port I2. The 2×2 switching function interchanges incoming signals at the input ports I1 and I2 that are addressed to the output ports O1 and O2.

The system according to the present invention is also reconfigurable and operates at very high speed. Using optical amplifiers as optical switches modifies the routing configuration in less than 5 nanoseconds.

Moreover, the AWG used are not rated higher than is strictly necessary, in contradistinction to the prior art systems. For input multiplexes comprising N frequencies, the AWG used in the present invention are adapted to route a maximum of N+2 frequencies. They are therefore less complex and significantly reduce the size of the system according to the invention compared to the prior art solutions.

Finally, the system according to the invention merely necessitates a single add port and a single drop port, instead of as many add and drop ports as there are frequencies to be added or dropped.

Figure 4:
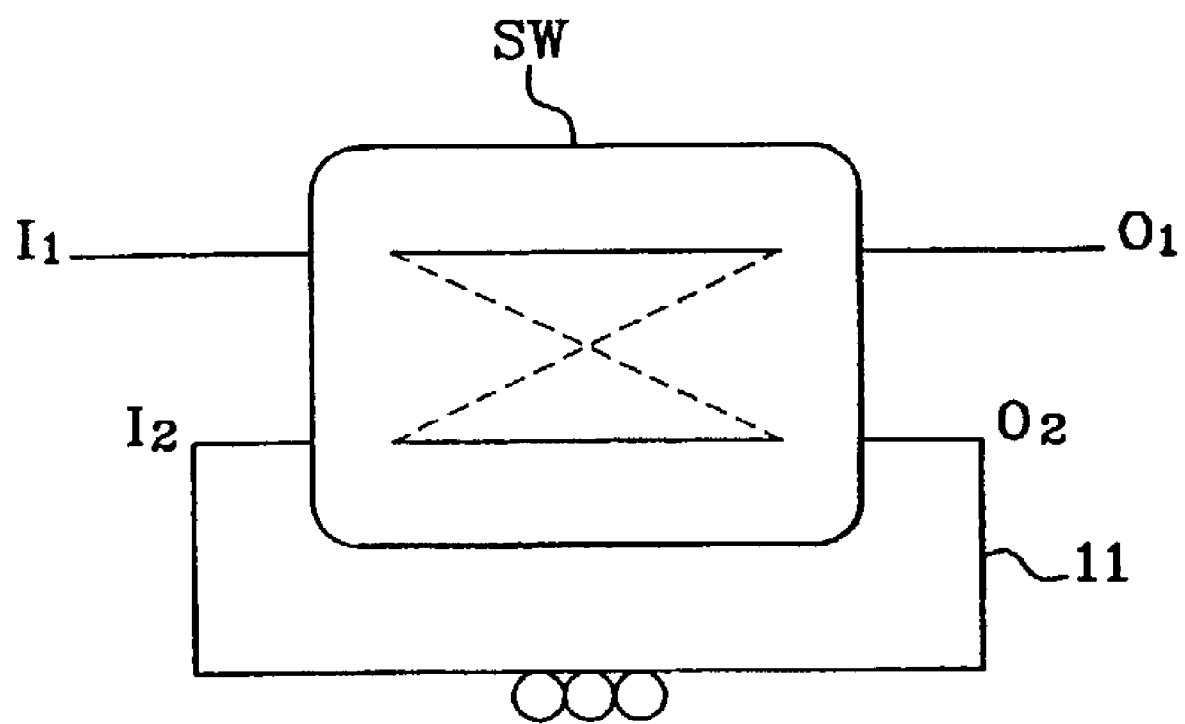
FIG. 4 is a simplified diagram of the frequency switching system shown in FIG. 3, associated with an optical delay loop and thus forming a variable and reconfigurable optical delay circuit.

FIG. 4 shows a variant of the optical switching system according to the present invention to which an optical loop is added to implement a variable optical delay circuit. Thus, in FIG. 4, the switching system SW, which is shown diagrammatically and in a simplified manner compared to FIG. 3, is associated with an optical loop 11 connecting the output port O2, which is called the drop port, of the switching system SW according to the invention to the input port I2, which is called the add port (for clarification, the input ports I1 and I2 have been interchanged in FIG. 4 compared to FIG. 3).

Figure 5:
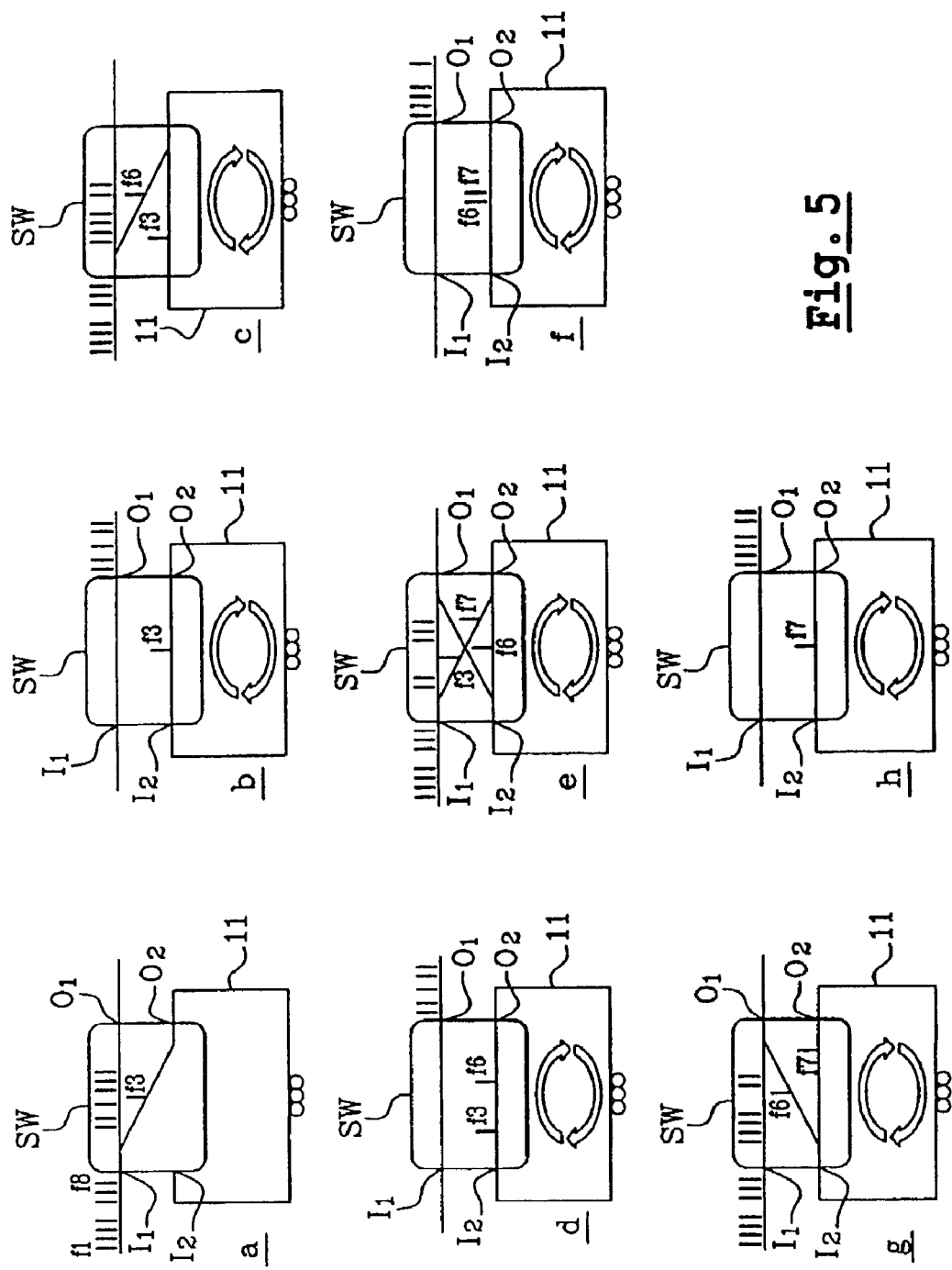
FIG. 5 shows various steps of the operation of one embodiment of the optical delay circuit.

The output port O2 is therefore connected to the input port I2 by the optical loop 11. The great flexibility of the switching system according to the invention, which selectively connects the input port I2 to the output port O2 for each frequency, can then be used, in combination with the optical loop 11, to store a selected frequency for a variable time. FIG. 5 shows one example of the operation of this optical delay circuit.

First of all, a multiplex comprising eight frequencies f1 to f8 is sent to the input port $I_1$. In step a, the frequency f3 is sent from the input port $I_1$ to the output port $O_2$ and all the other frequencies are sent to the output port $O_1$. This is of course made possible by appropriately activating various optical switches in the optical switching stages D, C, A and B, as explained with reference to FIG. 3.

In FIG. 5, step b shows that $I_2$ is selectively connected to $O_2$, thereby creating an optical delay loop 11 for the selected frequency f3. Steps c and d show that it is possible at any time to insert another frequency, here the frequency f6, into the optical delay loop whilst retaining the frequency f3 in the loop. In step e, a third frequency f7 is inserted into the optical delay loop 11 and the frequency f3 is extracted from the loop and sent to the output port $O_1$. Step f shows that only the frequencies f6 and f7 then remain in the optical delay loop 11. At the required time (see step g), the frequency f6 is in turn extracted from the optical delay loop 11, whereas the frequency f7 remains there until the required duration of the delay is reached (see step h).

This process, described by way of example only with reference to FIG. 5, can be implemented thanks to the particular characteristics already referred to of the switching system according to the present invention, providing for selective 2×2 switching for each frequency simultaneously between the input ports $I_1$ and $I_2$ and the output ports $O_1$ and $O_2$. The complete process implemented by the optical delay circuit according to the present invention is therefore made possible by the possibility of selectively and completely reconfiguring the two 2×2 switching system for each frequency by activating the various optical switches constituting the optical switching stages D, C, A and B of the switching system.

The optical delay circuit of the present invention can therefore selectively store, delay and extract one or more frequencies from the input multiplex, the duration of the delay being entirely flexible. Accordingly, any frequency can be delayed for any required time although, if the optical switches are optical amplifiers, this is subject to the constraint of the noise factor due to accumulation of noise on each passage of the delayed frequencies round the loop. One solution would then be to place a filter on the far side of each of the optical switches of the various switching stages of the system.

What is claimed is:

1. A reconfigurable optical switching system for selectively coupling one or more frequencies of first and second input frequency division multiplexed signals comprising N channels to first and second output ports, wherein said system comprises:

a demultiplexer comprising at least a first input port and a second input port that receive respectively said first and second frequency division multiplexed signals comprising N channels, and at least N+2 output ports, in which said demultiplexer, for all values of i from 1 to N, the output port numbered i of said demultiplexer receives the corresponding frequency numbered i of the first multiplexed signal received at the first input port, and, for all values of i from 3 to N+2, the output port numbered i of said demultiplexer receives the frequency numbered i−2 of the second multiplexed signal received at the second input port, a multiplexer comprising at least N+1 input ports and at least two output ports, in which said multiplexer, for all values of i from 2 to N+1, the input port numbered i of said multiplexer routes the frequency numbered i−1 to the first output port of said multiplexer, and, for values of i from 1 to N, the input port numbered i of said multiplexer routes the frequency numbered i to the second output port of said multiplexer, and an optical switching circuit, wherein for i from 3 to N, any output port numbered i of said demultiplexer may be selectively connected to the input port numbered i−2 of said multiplexer, to the input port numbered i−1 of said multiplexer, or to the input port numbered i+1 of said multiplexer, and wherein the output ports numbered 1 and 2 of said demultiplexer are selectively and respectively connected to the input ports numbered 1 or 2 of said multiplexer and to the input ports numbered 2 or 3 of said multiplexer, and wherein the output ports numbered N+1 and N+2 of said demultiplexer are selectively and respectively connected to the input ports numbered N−1 or N of said multiplexer and to the input ports numbered N or N+1 of said multiplexer.

2. The system according to claim 1, wherein the demultiplexer and the multiplexer are both of the AWG type.

3. The system according to claim 1, wherein the optical switching circuit comprises four interleaved stages, and wherein each stage comprises N optical switches.

4. The system according to claim 3, wherein the optical switches are optical amplifiers.

5. A variable and reconfigurable optical delay circuit, comprising an optical switching system and an optical delay loop, connecting an output port to an input port of said switching system, wherein the optical switching system selectively couples one or more frequencies of first and second input frequency division multiplexed signals comprising N channels to first and second output ports, wherein said system comprises:

a demultiplexer comprising at least a first input port and a second input port that receive respectively said first and second frequency division multiplexed signals comprising N channels, and at least N+2 output ports, in which said demultiplexer, for all values of i from 1 to N, the output port numbered i of said demultiplexer receives the corresponding frequency numbered i of the first multiplexed signal received at the first input port, and, for all values of i from 3 to N+2, the output port numbered i of said demultiplexer receives the frequency numbered i−2 of the second multiplexed signal received at the second input port, a multiplexer comprising at least N+1 input ports and at least two output ports, in which said multiplexer, for all values of i from 2 to N+1, the input port numbered i of said multiplexer routes the frequency numbered i−1 to the first output port of said multiplexer, and, for values of i from 1 to N, the input port numbered i of said multiplexer routes the frequency numbered i to the second output port of said multiplexer, and an optical switching circuit, wherein i from 3 to N, any output port numbered i of said demultiplexer may be selectively connected to the input port numbered i−2 of said multiplexer, to the input port numbered i−1 of said multiplexer, or to the input port numbered i+1 of said multiplexer, and wherein the output ports numbered 1 and 2 of said demultiplexer are selectively and respectively connected to the input ports numbered 1 or 2 of said multiplexer and to the input ports numbered 2 or 3 of said multiplexer, and wherein the output ports numbered N+1 and N+2 of said demultiplexer are selectively and respectively connected to the input ports numbered N−1 or N of said multiplexer and to the input ports numbered N or N+1 of said multiplexer.

* * * * *